Figure 1:
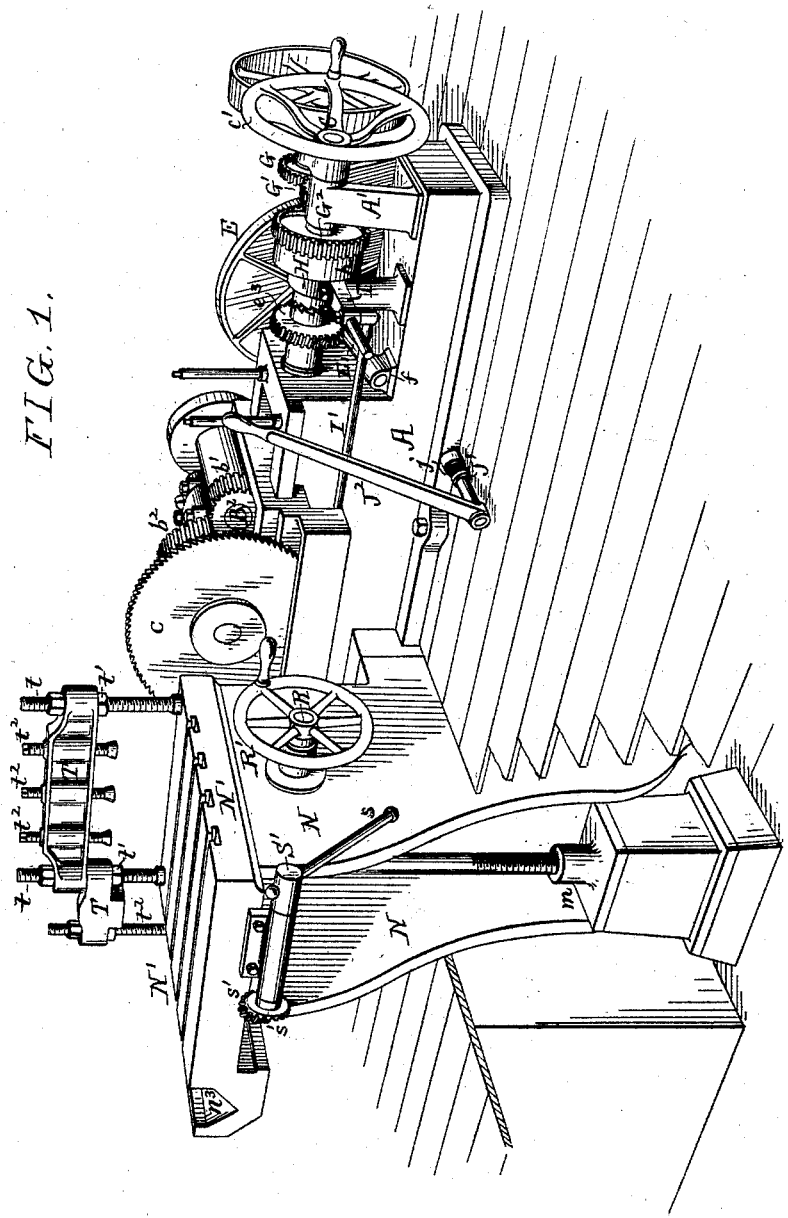

(No Model.) 4 Sheets—Sheet 2.
C. C. NEWTON.
MACHINE FOR SAWING METAL.

No. 524,556. Patented Aug. 14, 1894.

FIG. 2.

WITNESSES
F. D. Goodwin
L. D. Turner

INVENTOR
Chas. C. Newton
By his Attorneys
Howson & Howson

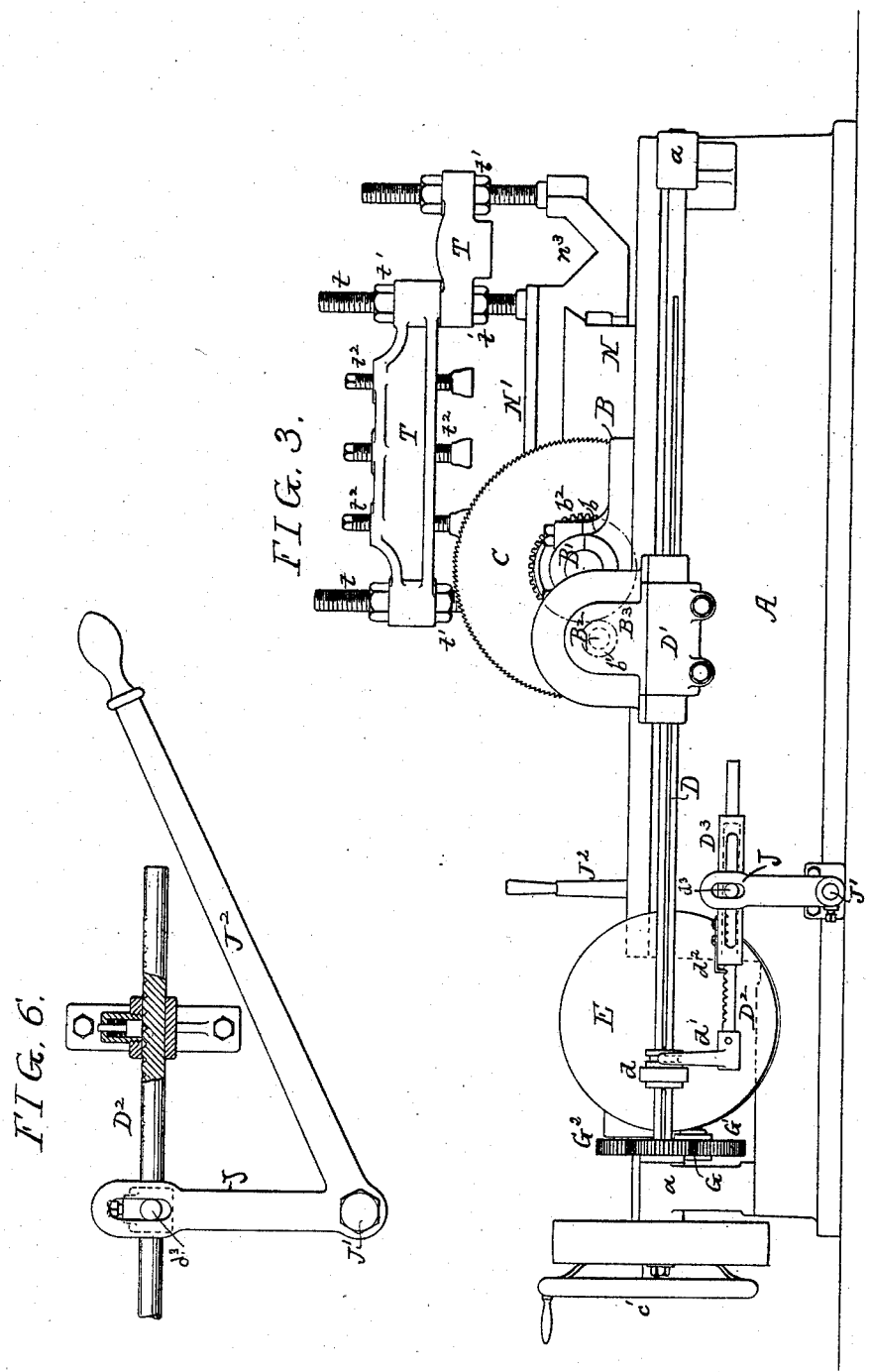

(No Model.) 4 Sheets—Sheet 4.
C. C. NEWTON.
MACHINE FOR SAWING METAL.
No. 524,556. Patented Aug. 14, 1894.
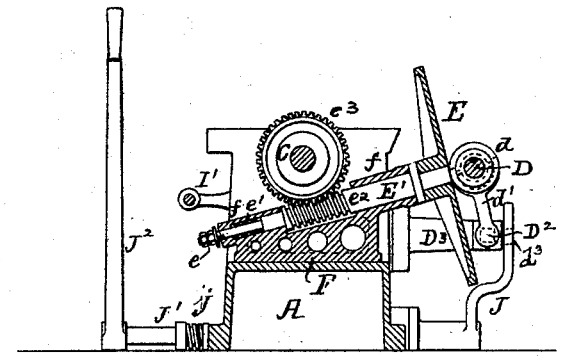
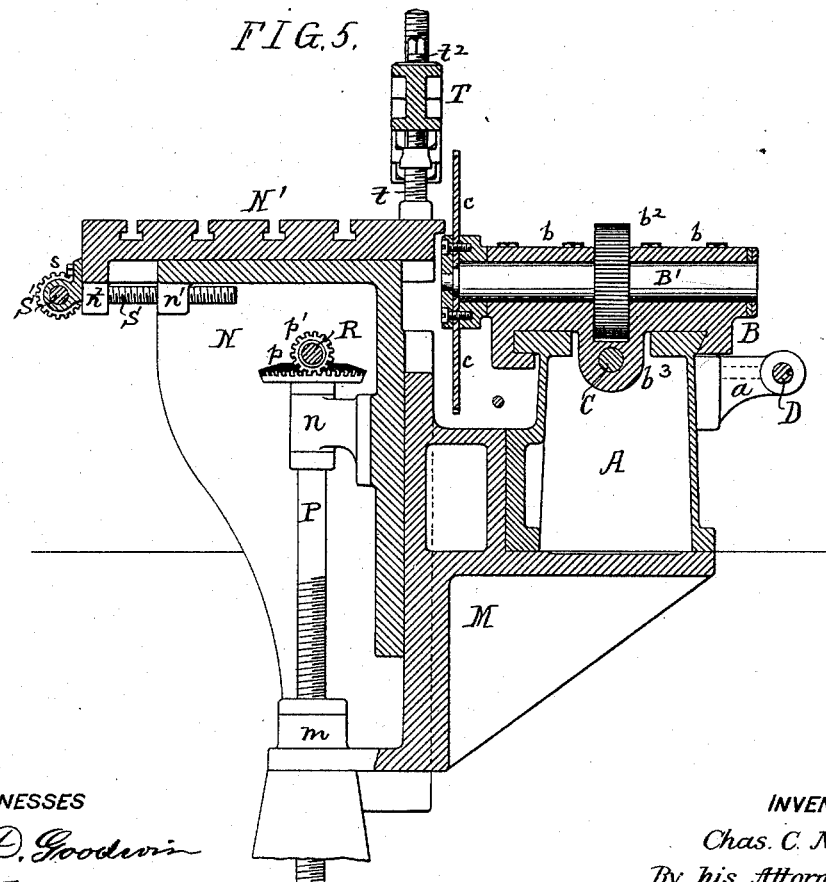
WITNESSES
F. D. Goodwin
K. D. Turner
INVENTOR
Chas. C. Newton
By his Attorneys
Howson & Howson

UNITED STATES PATENT OFFICE.

CHARLES C. NEWTON, OF PHILADELPHIA, PENNSYLVANIA.

MACHINE FOR SAWING METAL.

SPECIFICATION forming part of Letters Patent No. 524,556, dated August 14, 1894.

Application filed February 7, 1894. Serial No. 499,315. (No model.)

*To all whom it may concern:*

Be it known that I, CHARLES C. NEWTON, a citizen of the United States, residing in Philadelphia, Pennsylvania, have invented certain Improvements in Machines for Sawing Metal, of which the following is a specification.

The object of my invention is to construct a machine for sawing cold metal, my invention relating to certain improvements on the patent granted to me on August 27, 1889, No. 410,009.

In the accompanying drawings:—Figure 1, is a perspective view of my improved metal sawing machine. Fig. 2, is a plan view. Fig. 3, is a side view. Fig. 4, is a section on the line 4—4, Fig. 2. Fig. 5, is a section on the line 5—5, Fig. 2. Fig. 6, is a view of a modification.

A is the bed of the machine on which slides the carriage B, on this carriage are bearings $b$ for the saw spindle B' and for the shaft $B^2$ which is geared to the saw spindle by gear wheels $b'$, $b^2$.

$c$ is the saw clamped to the end of the spindle in any suitable manner.

Depending from the under side of the carriage B is a lug $b^3$ having a screw threaded orifice and passing through this orifice is the feed screw C for the carriage, this screw is mounted in bearings at each end of the bed and in bearings on a standard A', on the end of this screw shaft is a hand wheel $c'$ by which the screw shaft can be turned.

D is the driving shaft of the machine extending along one side of the bed and having its bearings in brackets $a$, $a$. Splined on the shaft D is a worm D' meshing with a worm wheel $B^3$ on the shaft $B^2$, this worm and worm wheel are incased, as shown in Fig. 2, and the case is so formed as to hold sufficient oil to keep the parts thoroughly lubricated, thus while the carriage on which is mounted the saw spindle can travel on the bed the spindle will always be in gear with the driving shaft. Also splined to the shaft D is a friction wheel $d$ which is in frictional contact with a disk E mounted on an inclined shaft E', as clearly shown in Fig. 4; the pressure of the disk against the wheel can be regulated by a nut $e$ on the end of the shaft. A spring $e'$ tends to keep the disk always in contact with the wheel.

The shaft E' is mounted in inclined bearings $f$, $f$, on a block F secured to or forming part of the bed of the machine. On this inclined shaft is a worm $e^2$, which meshes with a worm wheel $e^3$ loose on a screw shaft C. By inclining the shaft E' the screw shaft is geared direct with the driving shaft through said inclined shaft.

On the driving shaft D is a gear wheel G meshing with an intermediate gear wheel G' on a stud $g$ and this intermediate wheel meshes with a gear wheel $G^2$ loose on the shaft C.

Splined to the shaft C is a clutch sleeve H having teeth which positively engage with teeth on the hub of the worm wheel $e^3$ when in one position and having a friction socket $h$ engaging with the friction hub $g'$ on the gear wheel $G^2$ when in the opposite position; this sleeve H is controlled by a lever I pivoted at $i$ so that it can be either placed in a central position out of gear entirely or thrown in gear with the worm wheel to make a slow positive forward feed or thrown into gear with the gear wheel $G^2$ which will quickly return the carriage.

To the hand lever I is attached an operating rod I' extending to a point in front of the machine within easy reach of the operator.

Forming part of the foundation of the machine is a frame M on which is mounted a vertically sliding bracket N carrying the table N'. Mounted in a bearing $n$ on the bracket N is a vertical screw shaft P which passes through a nut $m$ secured to or forming part of the frame M; this screw shaft is geared to a shaft R by a gear wheel $p$ and bevel pinion $p'$. The shaft R projects through the bracket N and is provided with a hand wheel R', as clearly shown in Fig. 1, so that on turning the wheel the bracket can be raised or lowered to adjust the table for the saw.

The table can be fed laterally toward or from the saw by a feed screw S adapted to a nut $n'$ on the bracket and to a bearing $n^2$ on the table N', this screw is geared to a shaft S' by miter wheels $s'$ and the shaft has a suitable handle s, as shown in Fig. 1, but the shaft S may be provided with a handle and the shaft S' dispensed with in some instances.

The table has a series of undercut grooves for the reception of work clamps and has a V-shaped trough $n^3$ for round work; projecting from the table are screws $t, t$ having nuts $t'$ supporting the clamp frame T which is vertically adjustable on the screws and in this frame are clamp screws $t^2$ for clamping the work to the table.

In order to increase or diminish the speed of the feed of the carriage I so mount the friction wheel on the main shaft D that it can be moved toward or from the center of the disk E and in the hub of this wheel $d$ is a groove with which engages an arm $d'$ secured to a bar $D^2$ mounted in a bearing $D^3$ projecting from the base of the machine, as clearly shown in Fig. 3, the upper edge of the bar $D^2$ is notched and on the bearing $D^3$ is a spring $d^2$ which engages with the notches and holds the friction wheel in its adjusted position. On the bar $D^2$ is a pin $d^3$ which enters a slot in the operating arm J secured to a transverse shaft J' which passes through the base of the machine and attached to this shaft is an operating lever $J^2$ on moving which the shifting bar can be moved to shift the friction wheel toward or from the center of the disk; a friction spring $j$ may be used to retain the shaft in the adjusted position.

In some instances the shifter may be made as shown in Fig. 6 in which the shifter lever is mounted on a stud projecting from the frame of the machine, one arm of said lever engaging with a pin on a collar secured to the shifting bar, the notched portion of the shifting bar passing through a bearing in which is a spring pawl having a tooth engaging with any one of the notches in the bar.

The operation of the machine is as follows:—The work is clamped on the table and the table adjusted toward or from the saw and to the proper level, after which the machine is set in motion and the friction wheel adjusted on the shaft to the speed desired, the clutch is then thrown into gear with the friction driving mechanism and the carriage is fed forward, the saw cutting off the bar or plate. By shifting the clutch to the quick return gear the carriage and saw are quickly returned, the machine is then stopped and the work removed from the table.

I claim as my invention—

1. The combination in a machine for sawing metal, of the bed, a carriage thereon, a saw spindle adapted to bearings on said carriage, a driving shaft mounted in bearings on the bed and geared to the saw spindle, a feed screw for the carriage, a friction wheel adapted to slide on but turn with the driving shaft, an inclined shaft, a friction disk thereon engaging with the friction wheel, a worm on said shaft, a worm wheel on the feed screw, whereby the feed screw is connected directly with the driving shaft through the inclined shaft, substantially as described.

2. The combination in a metal sawing machine, of the base, the carriage mounted thereon, the feed screw for said carriage, the worm wheel on said feed screw, an inclined shaft, a worm thereon engaging with the worm wheel, a driving shaft, a friction wheel on said driving shaft, a friction disk on the inclined shaft, a notched shifting bar engaging with the hub of the friction wheel, a shifting lever engaging with the bar, and a spring pawl adapted to one of the notches in the shifting bar, substantially as described.

3. The combination of the bed of the machine, the reciprocating carriage thereon, mechanism for reciprocating said carriage, the saw spindle mounted on the carriage, a bracket N adapted to ways in the side of the bed, a screw P mounted in a bearing $n$ on said bracket, a nut $m$ on the bed to which the screw is adapted, a handled shaft R geared to the screw P, whereby the bracket is vertically adjusted, a work table N' on the bracket and a screw S for adjusting the work table toward and from the face of the saw, substantially as described.

In testimony whereof I have signed my name to this specification in the presence of two subscribing witnesses.

CHARLES C. NEWTON.

Witnesses:
H. W. CHAMPION,
E. J. HANNUM.